US011585963B2

(12) United States Patent
Aschwanden

(10) Patent No.: US 11,585,963 B2
(45) Date of Patent: Feb. 21, 2023

(54) OPTICAL DEVICE, PARTICULARLY CAMERA, PARTICULARLY COMPRISING AUTOFOCUS AND IMAGE STABILIZATION

(71) Applicant: OPTOTUNE CONSUMER AG, Dietikon (CH)

(72) Inventor: Manuel Aschwanden, Allenwinden (CH)

(73) Assignee: OPTOTUNE CONSUMER AG, Dietikon (CH)

(*) Notice: Subject to any disclaimer, the term of this patent is extended or adjusted under 35 U.S.C. 154(b) by 235 days.

(21) Appl. No.: 16/324,921

(22) PCT Filed: Aug. 3, 2017

(86) PCT No.: PCT/EP2017/069747
§ 371 (c)(1),
(2) Date: Feb. 12, 2019

(87) PCT Pub. No.: WO2018/029094
PCT Pub. Date: Feb. 15, 2018

(65) Prior Publication Data
US 2021/0278569 A1 Sep. 9, 2021

(30) Foreign Application Priority Data
Aug. 12, 2016 (EP) .................................. 16184124

(51) Int. Cl.
*G02B 3/14* (2006.01)
*G02B 7/02* (2021.01)
(Continued)

(52) U.S. Cl.
CPC ............... *G02B 3/14* (2013.01); *G02B 7/021* (2013.01); *G02B 7/09* (2013.01); *G02B 27/646* (2013.01)

(58) Field of Classification Search
CPC .... G02B 26/004; G02B 27/646; G02B 7/021; G02B 3/12; G02B 13/0075; G02B 7/09;
(Continued)

(56) References Cited

U.S. PATENT DOCUMENTS 5,917,657 A 6/1999 Kaneko et al.
2010/0276492 A1* 11/2010 Wang ....................... G02B 3/14
235/470

(Continued)

FOREIGN PATENT DOCUMENTS

EP 2860556 4/2015
WO 2016087602 6/2016

*Primary Examiner* — Ephrem Z Mebrahtu
(74) *Attorney, Agent, or Firm* — JMB Davis Ben-David

(57) ABSTRACT

The invention relates to an optical device (1), comprising: a first housing section (3), a cover element (20) connected to the first housing section (3), a transparent and elastically expandable membrane (10) which is arranged in said first housing section (3), a container (2) having a volume (V), wherein the membrane (10) forms part of the container (2), and wherein said container (2) is arranged in said first housing section (3), a transparent fluid (F) residing in said volume (V) of the container (2), a lens shaping part (11) that is in contact with the membrane (10) for defining a curvature-adjustable area (10c) of the membrane (10), which area (10c) faces said cover element (20), a circumferential lens barrel (50) that holds at least one rigid lens (51) facing said container (2), wherein the lens barrel is arranged in said first housing section, an image sensor (52) facing the lens barrel and the container (2), a second housing section (4), wherein the image sensor is arranged on the second housing section, and an actuator means (40) that is designed to move the lens barrel with respect to the first housing section (3) in an axial direction so as to exert a force on said membrane via the lens shaping part for adjusting the pressure of the fluid (F) residing inside the volume (V) and therewith a curvature of (Continued)

said area (10c), wherein said axial direction (A) is oriented perpendicular to a plane (P) along which said image sensor (52) extends, and wherein the actuator means (40) is optionally further designed to one of: moving the lens barrel (50) together with the first housing section (3) and said container (2) parallel to said plane (P); tilting the lens barrel (50) with respect to the first housing section (3) about a rotation axis running parallel to said plane (P) so as to exert a force on said membrane (10) via the lens shaping part (11) that deforms the container (2) in order to deflect light traveling through the container (2).

20 Claims, 4 Drawing Sheets

(51) Int. Cl.
*G02B 27/64* (2006.01)
*G02B 7/09* (2021.01)

(58) Field of Classification Search
CPC .......... G02B 7/08; G02B 3/14; G02B 13/009; H04N 5/2254; H04N 5/23287
See application file for complete search history.

(56) References Cited

U.S. PATENT DOCUMENTS

| | | |
|---|---|---|
| 2013/0265647 A1 | 10/2013 | Kern |
| 2016/0259094 A1* | 9/2016 | Aschwanden ........... G02B 3/12 |
| 2019/0072836 A1* | 3/2019 | Karp ...................... G03B 15/05 |
| 2019/0170914 A1* | 6/2019 | Fuller .................. H04N 5/2254 |

* cited by examiner

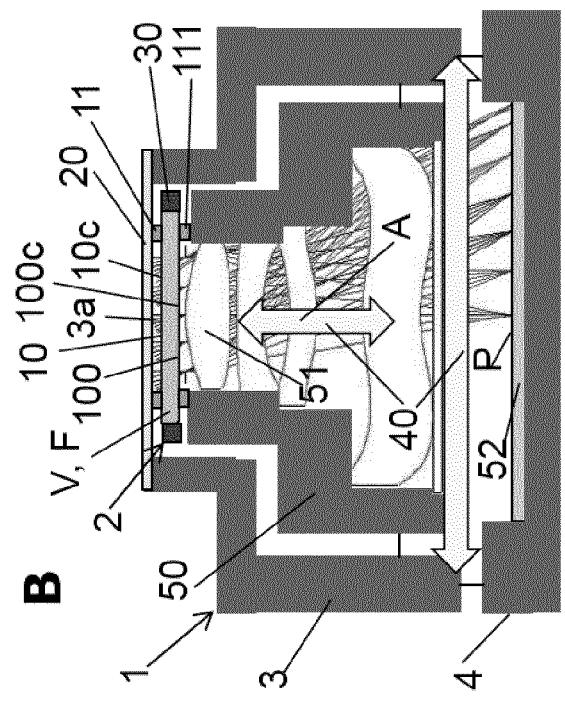
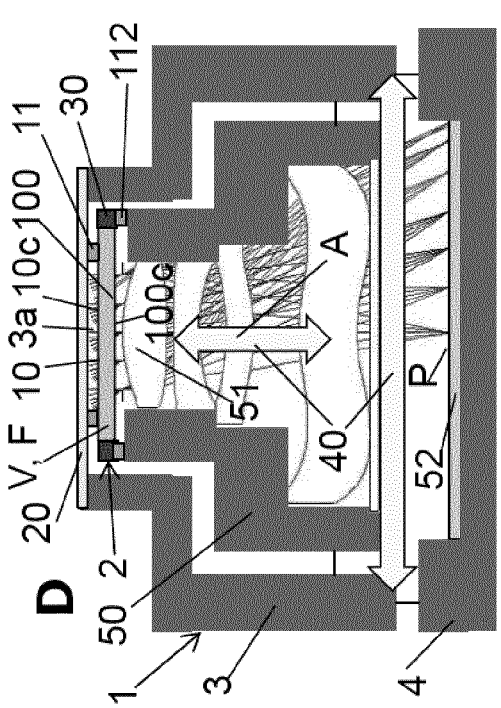
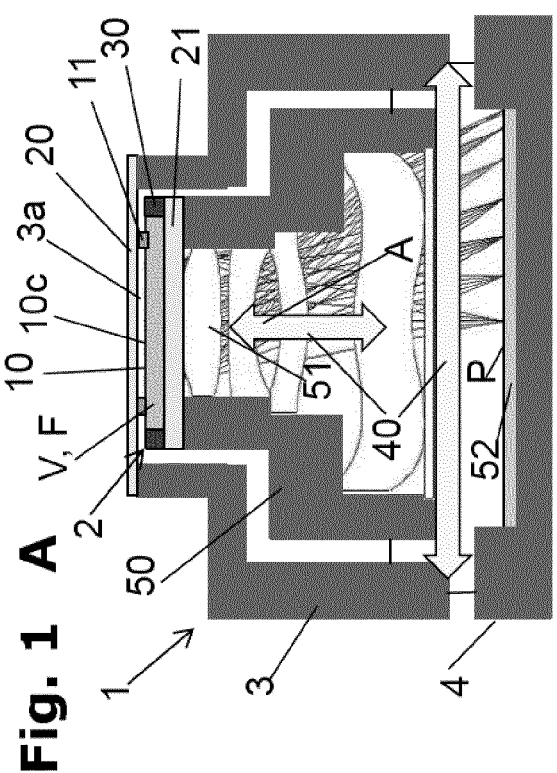
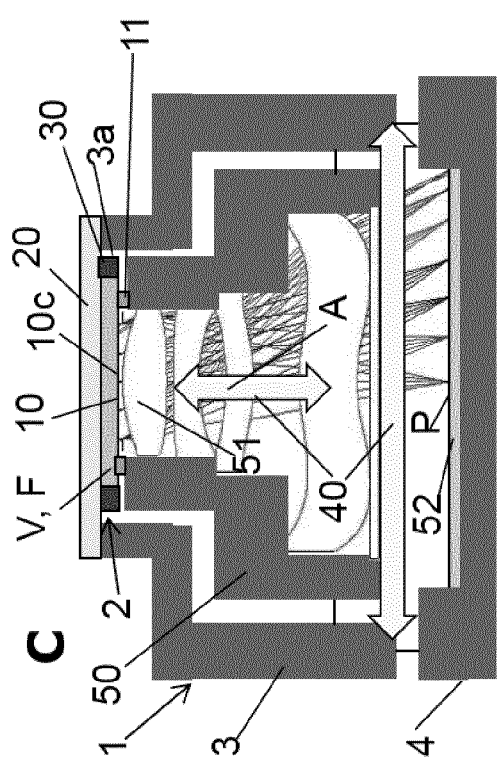
Fig. 1

OPTICAL DEVICE, PARTICULARLY CAMERA, PARTICULARLY COMPRISING AUTOFOCUS AND IMAGE STABILIZATION

CROSS-REFERENCE TO RELATED APPLICATIONS

This is the U.S. National Stage of International Application No. PCT/EP2017/069747 filed on Aug. 3, 2017, which was published in English under PCT Article 21(2), which in turn claims priority to European Patent Application No. 16184124.2 filed on Aug. 12, 2016.

The invention relates to an optical device according to the preamble of claim 1.

Based on the above, the problem underlying the present invention is to provide an optical device that allows for tuning the focal length of the device and particularly also for adjusting the light beam direction (e.g. for the purpose of image stabilization, beam redirecting or super resolution) in a simple manner.

This problem is solved by an optical device having the features of claim 1.

Preferred embodiments of the optical device are stated in the corresponding sub claims and are described below.

According to claim 1, the optical device according to the invention comprises

- a first housing section (which particularly comprises an opening for receiving incoming light),
- an (e.g. transparent) cover element, which cover element can close said opening of the first housing section (e.g. to protect the membrane from dust), wherein optionally said cover element may also comprise a through-hole through which the membrane, see below, can protrude),
- a transparent and elastically expandable membrane which faces said cover element and is arranged in said first housing section,
- a container having a volume, wherein the membrane forms part of the container, and wherein said container is arranged in said first housing section,
- a transparent fluid residing in said volume of the container adjacent said membrane, and
- a lens shaping part that is in contact with the membrane for defining a curvature-adjustable area of the membrane, which area faces said cover element, and
- a circumferential lens barrel that holds at least one rigid lens facing said container, wherein the lens barrel is arranged in said first housing section
- an image sensor facing the lens barrel and the container
- a second housing section, wherein the image sensor is arranged on the second housing section, and
- an actuator means that is designed to move the lens barrel with respect to the first housing section in an axial direction so as to exert a force on said membrane via the lens shaping part for adjusting the pressure of the fluid residing inside the volume and therewith a curvature of said area, wherein said axial direction is oriented perpendicular to a plane along which said image sensor extends.

According to a preferred embodiment of the present invention, the actuator means is further designed to one of:

- moving the lens barrel together with the first housing section and said container in a direction parallel to said plane, or
- tilting the lens barrel with respect to the first housing section about a rotation axis running parallel to said plane so as to exert a force on said membrane via the lens shaping part that deforms the container in order to deflect light traveling through the container.

Particularly, the actuator means can comprise separate actuators for moving the barrel along the axial direction and for moving the barrel parallel to said plane P or tilting it. The actuator means can be or comprise an electromagnetic actuator, a piezo actuator, an electroactive polymer actuator, a shape memory alloy, or a electrostrictive actuator.

Particularly, said rotation axis is not necessarily a fixed rotation axis, but the lens barrel can be supported in a way that it can be tilted about a plurality of different (e.g. virtual) rotation axes that extend parallel to the image sensor. This can be achieved by supporting or suspending the lens barrel accordingly (e.g. universal joint).

Particularly, according to an embodiment, the lens barrel can be tilted independently about two different rotation axes that extend parallel to the image sensor, respectively (i.e. the lens barrel can be tilted in a two-dimensional manner).

Further, particularly, according to an embodiment, the lens barrel is supported such that it can be tilted about an infinitesimal number of rotation axes extending parallel to the image sensor (also here the lens barrel can be tilted in a two-dimensional manner).

Further, particularly, in embodiments where the lens barrel is tiltable, the two housing sections are rigidly connected to one another and may even be integrally connected to one another.

Due to the fact, that the membrane can be elastically deformed for adjusting the curvature of said area, said container and the fluid residing therein form a focus adjustable (or tunable) lens.

Particularly, the fact that the lens shaping part contacts the membrane can mean that the lens shaping part contacts the membrane directly or indirectly via another material layer (e.g. formed by a glue etc.). The lens shaping part can further be attached to the membrane by bonding it directly to the membrane or via another material layer such as a glue layer.

Particularly, by way of moving the lens barrel along the axial direction, an autofocus function of the optical device can be implemented. Furthermore, by means of tilting the lens barrel or moving it (together with the container) along the image sensor, an optical image stabilization can be achieved. Herein, the notion optical image stabilization means that an unwanted movement of the optical device is detected by means of a suitable sensor means of the optical device, which unwanted movement yields to an unwanted movement of an image projected onto the image sensor, wherein the lens barrel is now tilted to compensate for the unwanted movement and to shift the image back to its original position on the image sensor.

Further, regarding the aspect of the present invention relating to the tiltable lens barrel, the invention allows to axially shift and/or tilt a single component, namely the lens barrel (as well as components that are rigidly connected thereto), for providing optical image stabilization, beam redirecting and/or super resolution while allowing at the same time to adjust the focal length of the focus adjustable lens formed by the container and the fluid therein for providing e.g. an autofocus function. Particularly, due to the tilting movement, the lens shaping part acts on the membrane in a way that the container is deformed into a wedge shape or prism which yields a corresponding deflection of light beams passing through the container.

Further, when tilting, the actuator means is preferably designed to be controlled such that the pressure in the fluid residing in the container is kept constant, so that the curvature of said area of the membrane is kept constant upon tilting the wall member/optical element. This means that during such tilting movement the focal length of the lens can be maintained. However, it is also possible to tilt the lens barrel and to change the curvature of said area of the membrane at the same time.

Furthermore, shifting the incidence of a light beam passing through the container on the image sensor (e.g. for the purpose of optical image stabilization) can also be achieved pursuant to the other aspect of the present invention, wherein here the lens barrel can be moved axially (i.e. along the first direction) and can further be moved (independently from said movement in or counter to the first direction) together with the container along said second direction, namely parallel to the image sensor, e.g. for providing optical image stabilization and/or super resolution while allowing at the same time to adjust the focal length of the focus adjustable lens.

Particularly, when the lens barrel is moved along the first direction the lens shaping part presses against (or pulls on) the membrane accordingly.

Particularly, the notion according to which the lens shaping part defines an area of the membrane that has an adjustable curvature means that the lens shaping part delimits, by being attached to the membrane or by contacting the latter, an elastically expandable (e.g. circular) area of the membrane, wherein particularly said area extends up to an (e.g. circumferential) inner edge of the lens shaping part. This area may also be denoted as optically active area since the light passes through this area of the lens and is affected by the curvature of this area.

When the lens shaping part presses against the membrane due to the movement of the lens barrel, the pressure of the fluid residing in the container increases due to the essentially constant volume of the fluid in the container causing the membrane to expand and said curvature of said area of the membrane to increase. Likewise when the lens shaping part pushes less against the membrane or even pulls the membrane, the pressure of the fluid decreases causing the membrane to contract and said curvature of said area of the membrane to decrease. Increasing curvature thereby means that said area of the membrane may develop a more pronounced convex bulge, or that said area of the membrane changes from a concave or a flat state to a convex one. Likewise, a decreasing curvature means that said area of the membrane changes from a pronounced convex state to a less pronounced convex state or even to a flat or concave state, or changes from a flat or concave state to an even more pronounced concave state.

Further, when tilting the lens barrel, the actuator means is preferably designed to be controlled such that the pressure in the fluid is kept constant, so that the curvature of the membrane is kept constant upon tilting the lens barrel.

Generally, the membrane can be made of at least one of the following materials: a glass, a polymer, an elastomer, a plastic or any other transparent and stretchable or flexible material. For example, the membrane may be made out of a silicone-based polymer such as poly(dimethylsiloxane) also known as PDMS or a polyester material such as PET or a biaxially-oriented polyethylene terephtalate (e.g. "Mylar").

Further, the membrane can comprise a coating. Further, the membrane can also be structured, e.g. comprises a structured surface or have a variable thickness or stiffness across the membrane.

Further, said fluid residing in the container preferably is or comprises a liquid metal, a gel, a liquid, a gas, or any transparent, absorbing or reflecting material which can be deformed. For example, the fluid may be a silicone oil (e.g.

Bis-Phenylpropyl Dimethicone). Additionally, the fluid may include fluorinated polymers such as perfluorinated polyether (PFPE) inert fluid.

Furthermore, the cover element and/or the at least one rigid lens in the lens barrel is preferably rigid compared to the membrane. Preferably, the cover element is formed out of or comprises: a glass, a plastic, a polymer, or a metal. It can comprise or can be formed as a (e.g. glass) flat window, a lens, a mirror, a micro structured element with refractive, diffractive and/or reflective structures.

Further, according to an embodiment of present invention, the cover element may comprise a coating (e.g. anti-reflection).

Particularly, the image sensor may be a semiconductor charge-coupled device (CCD), a metal-oxide-semiconductor (CMOS) or an N-type metal-oxide-semiconductor (NMOS) sensor or any other light sensitive sensor.

Further, according to an embodiment of the present invention, the container comprises a circumferential wall member to which said membrane is connected. Particularly, said wall member can be formed as a ring.

Particularly, according to an embodiment, the wall member is formed as a bellows. This particularly means that the wall member is deformable in the axial direction so that its height in this direction can be reduced. Particularly, the bellows comprises at least one circumferential crease, i.e., the bellows comprises at least two adjacent circumferential sections connected via said crease, which sections can be folded towards one another about said crease, which reduces the height of the wall member in the axial direction.

Furthermore, according to an embodiment, the lens shaping part is connected to the cover element via the wall member. Particularly, the wall member is arranged between the lens shaping part and the cover element in the axial direction.

Further, according to an embodiment, the membrane is connected to the lens barrel, particularly to a face side of the lens barrel that faces the cover element, wherein the membrane is arranged between the face side of the lens barrel and the lens shaping part (i.e. the lens shaping part delimits the volume of the container, too).

The presence of a bellows being configured as described above is advantageous due to the fact that now the fluid in a boundary region of the container volume between the lens shaping part and the cover element can simply be pushed towards the center of the container volume by the bellows when the lens shaping part moves towards the cover element (and thus folds the bellow sections towards one another so that the fluid is squeezed towards the center). Thus, trapping fluid in the boundary region of the volume or needing to push fluid through the gap formed by the lens shaping part and the cover element can be avoided. Therefore, the focusing speed is not limited by the fluid flow.

Furthermore, according to an embodiment of the present invention, the lens shaping part is connected to the cover element, wherein particularly the lens shaping part protrudes from an inside of the cover element towards the membrane. Particularly, the lens shaping part can be a circumferential member, particularly circular ring member.

Further, according to an embodiment of the present invention, the container comprises a rigid transparent element connected to the wall member and facing said membrane, wherein said fluid is particularly enclosed by the rigid transparent element, the wall member (forming a sidewall of the container) and the membrane.

Particularly, in an embodiment, said rigid transparent element is connected to the lens barrel, particularly via a side of the rigid transparent element that faces way from the wall member.

Further, according to an embodiment of the present invention, said rigid transparent element forms a lens.

Furthermore, according to an embodiment, said rigid transparent element is arranged in a central opening surrounded by the lens barrel and particularly forms a first lens of a lens stack that is arranged in said opening and held by the lens barrel.

Furthermore, according to an embodiment, said rigid transparent element comprises a protrusion protruding towards said membrane wherein particularly said protrusion comprises a circular cylindrical shape. Particularly, by way of this protrusion the volume of the container can be adjusted for matching e.g. the thermal expansion of the fluid to a thermal expansion of the wall member. This allows one to compensate the thermal expansion of the fluid and helps to stabilize the focal power over a broad range of temperatures.

Further, according to an embodiment of the present invention, the container comprises a further membrane that is connected to the wall member and faces said membrane, wherein particularly said fluid is now enclosed by the two membranes and the wall member forming a side wall of the container.

Furthermore, according to yet another embodiment of the present invention, the optical device comprises a further lens shaping part that is in contact with the further membrane for defining a curvature-adjustable area of the further membrane, which area faces the lens barrel. Here, due to the presence of a further lens shaping part, both curvature-adjustable areas of said membranes are deformed as described above when the barrel is moved along the first direction.

Particularly, the further lens shaping part is connected to the lens barrel and protrudes from the lens barrel towards the further membrane.

Furthermore, in an alternative embodiment in which the optical device comprises said two membranes, the optical device may comprises a support member instead of the further lens shaping part, which support member is configured to support the wall member. Particularly, the support member can be formed as a support ring on which the wall member of the container rests. Particularly, the support member is connected to the lens a barrel and protrudes from the lens barrel towards the wall member.

Furthermore, according to an embodiment of the present invention, particularly in case the lens barrel can be moved along the first direction and rotated about said rotation axis, the actuator means comprises a first and a second spring structure, four pairs of magnets, wherein in each magnet pair two magnets are arranged on top of one another in the axial direction and comprise an antiparallel magnetization (in the horizontal direction), and four electrical coils for receiving an electrical current, wherein said coils are attached to the lens barrel, and wherein each coil faces an associated magnet pair, and wherein the lens barrel is elastically supported via said two spring structures on said magnet pairs.

Furthermore, according to an embodiment of the present invention, the optical device comprises a control unit.

Further, in an embodiment, the control unit is configured to control the actuator means for automatically adjusting the focal length of the focus adjustable lens in order to provide an autofocus function and/or for providing optical image stabilization (see also above).

An actuator for the optical image stabilization preferably consists of at least two pairs of magnets and coils that interact with each other such that a Lorentz force is generated when a current is applied to the coil. By changing the direction of the current, the direction of the force can be changed and therefore the movement/rotation of the lens barrel can be controlled to achieve optical image stabilization.

Furthermore, according to a preferred embodiment of the present invention, said cover element forms an integral part of an (e.g. transparent) cover element (e.g. glass pane) of a housing of a mobile phone (or of another portable and/or hand-held device). In this case the optical device particularly forms a camera.

Furthermore, yet another aspect of the present invention relates to a mobile phone comprising a an optical device (e.g. camera) according to the present invention and an (e.g. partially transparent) cover element of a housing of the mobile phone, wherein said cover element of the optical device is an integral part of said (e.g. partially transparent) cover element of the housing.

Furthermore, according to yet another embodiment of the present invention, said cover element forms a lens.

Further, according to an embodiment, particularly in case the lens shaping part is connected to the lens barrel and moves with the latter, said cover element comprises a protrusion protruding towards said membrane. Also here, as explained above, the volume of the container in which the fluid resides can be adjusted to compensate the thermal expansion of the fluid.

Particularly, the present invention has the advantage, that the adjustable lens can be configured in a manner that it has a relatively small extension in the axial direction, which is mandatory in applications such as mobile phones and other small portable devices (in the estimation below, the widths of the membranes are considered to be negligible concerning axial installation space).

For instance, the cover element can have a thickness in the axial direction of about 75 μm.

Further, the lens shaping part/further lens shaping part/support member can have a thickness in the axial direction of about 50 μm to 100 μm.

Further, the wall member can have a thickness in the axial direction of about 100 μm.

Further, the rigid transparent element can have a thickness in the axial direction of about 75 μm.

Thus, apart from the lens barrel height in the axial direction, the adjustable lens only adds (depending on the respective embodiment) between 275 μm and 350 μm to the overall height in the axial direction, yielding a system that is in principle capable of autofocus (AF) and optical image stabilization (OIS) at the same time.

Furthermore, the size of the optical device according to the invention can be reduced by integrating the adjustable lens into the optical lens barrel and having the rigid transparent element be the first lens of the lens stack of the lens barrel.

Further features and advantages of the present inventions as well as embodiments of the present invention shall be described in the following with reference to the Figures, wherein FIGS. 1A to 1D show different embodiments of the optical device according to the invention, wherein the lens barrel can be moved in an axial direction to adjust the focal length of the optical device, and wherein further the lens barrel can be moved together with a first housing section and the container (adjustable lens) in the plane extending parallel to the image sensor;

Figure 2:
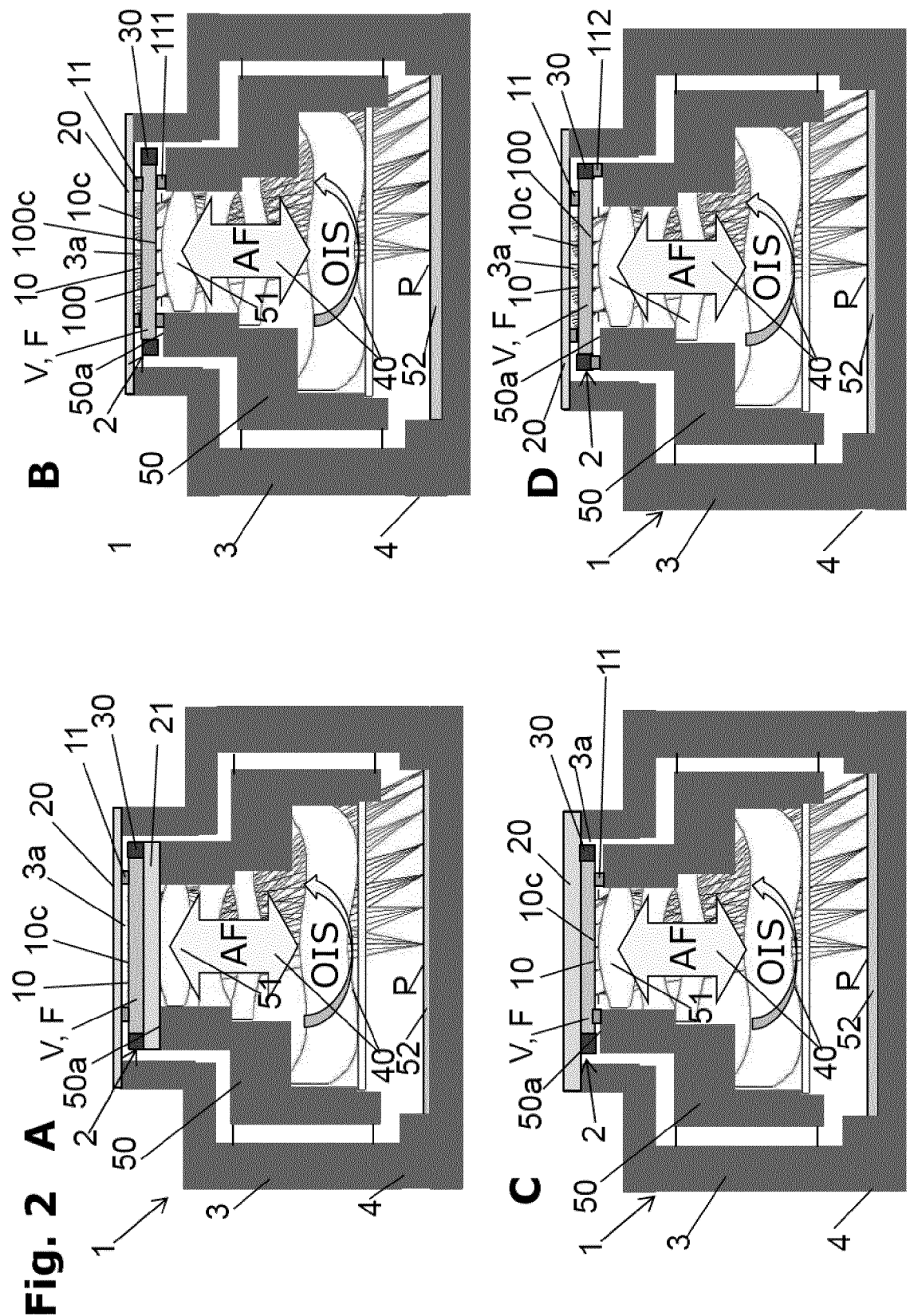
FIGS. 2A to 2D show different embodiments of the optical device according to the invention, wherein the lens barrel can be moved in an axial direction to adjust the focal length of the optical device, and wherein further the lens barrel can be tilted about a rotation axis that runs parallel to a plane along which said image sensor extends.

FIG. 1A shows an embodiment of an optical device 1 according to the present invention. Here, the optical device 1 comprises a first housing section 3 comprising an opening 3a, a transparent cover element 20 closing or covering said opening 3a of the first housing section 3, a transparent and elastically expandable membrane 10 which faces said cover element 20 in an axial direction A and is arranged in said first housing section 3, a container 2 having a volume V being filled with a transparent fluid F, wherein the membrane 10 forms part of the container 2 (i.e. helps enclosing said transparent fluid F), and wherein said container 2 is arranged in said first housing section 3, a lens shaping part 11 that is in contact with the membrane 10 for defining a curvature-adjustable area 10c of the membrane 10, which area 10c faces said cover element 20 in the axial direction A, a circumferential lens barrel 50 that holds at least one rigid lens 51 (or several such lenses) facing said container 2 in the axial direction A, wherein the lens barrel 50 is arranged in said first housing section 3, an image sensor 52 facing the lens barrel and the container, wherein the image sensor comprises a flat light sensitive surface for detecting incident light, which surface spans a plane P, a second housing section 4, wherein the image sensor 52 is arranged on the second housing section 4, and an actuator means 40 that is designed to move the lens barrel 52 with respect to the cover element 20 along said axial direction A with respect to the first housing section 3 so as to exert a force on said membrane 10 via the lens shaping part 11 for adjusting the pressure of the fluid F residing inside the volume V and therewith a curvature of said area 10c. As shown in FIG. 1A the axial direction A is oriented perpendicular to said plane P along which said image sensor 52 extends.

Furthermore, in the embodiment shown in FIG. 1A the actuator means 40 is further designed to move the lens barrel 50 together with the first housing section 3 and said container 2 in different directions running parallel to said plane P with respect to the second housing section 4 that holds the image sensor. By way of this movement, an optical image stabilization as described herein can be achieved.

Further, as shown in FIG. 1A, the container 2 comprises a circumferential wall member 30 for enclosing the fluid F, to which wall member 30 said membrane 10 is connected.

Furthermore, the lens shaping part 11 is connected to an inside of the cover element 20 and protrudes from said inside towards the membrane 10, where it defines said curvature-adjustable area 10c of the membrane 20.

The container 2 further comprises a rigid transparent element 21 connected to the wall member 30 and facing said membrane 20 in the axial direction A, so that the fluid F is held between the rigid transparent element 21 and the membrane 10. Here, the rigid transparent element 21 is connected to a circumferential face side of the lens barrel 50.

Thus, when the lens barrel is moved along the axial direction A it can be pushed with the membrane 10 ahead against the lens shaping part 11 (or can pull on the membrane via the lens shaping part 11) which allows to adjust the curvature of said area 10c and therewith the focal length of the adjustable lens 2 accordingly.

FIG. 1B shows a modification of the embodiment shown in FIG. 1A, wherein here in contrast to FIG. 1A the optical device 1 comprises a further membrane 100 instead of said rigid transparent element 21, as well as a further lens shaping part 111 that protrudes from the face side of the lens barrel 50 in the axial direction A towards the further membrane 100 and contacts the latter. Thus, when the lens barrel 50 is now moved in the axial direction A, both membranes 10, 100 are deformed by the respective lens shaping part 11, 111 so that the curvatures of the corresponding curvature-adjustable areas 10c, 100c are adjusted at the same time. Again, by way of this axial movement of the lens barrel 50, the focal power of the adjustable lens 2 can be adjusted.

Further, FIG. 1C shows another modification of the embodiment shown in FIG. 1A, wherein here the wall member 30 is connected to the inside of the cover element 20 and the membrane 10 is connected to the wall member 30 on a side facing away from the cover element 20. Further, in contrast to FIG. 1A, the lens shaping part 11 is connected to the face side 50A of the lens barrel 50, wherein the lens shaping part 11 protrudes in the axial direction A from the face side 50A of the lens barrel 50 towards the membrane 10 and contacts the latter so as to form said curvature-adjustable area 10c. Now, in case the lens barrel 50 is moved along the axial direction A it pushes (or pulls on) the membrane 10 via the lens shaping part 11 correspondingly, which adjusts the curvature of said area 10c as explained before.

Further, FIG. 1D shows a modification of FIG. 11B, wherein here the further lens shaping part 111 is substituted by a supporting member 112 on which the wall member 30 rests. Here, the membrane 10 is deformed by means of the lens shaping part 11. However, when the membrane 10 is deformed by means of the lens shaping part 11, also the further membrane 100 gets deformed due to the fact that it is coupled to the membrane 10 via the fluid F.

Furthermore, FIGS. 2A to 2D show further embodiments of the optical device 1 according to the invention. Here, in contrast to FIGS. 1A to 1D, the lens barrel 50 is not movable together with the first housing section 3 and the container 2 along said plane P, but is supported or suspended in the way that it can be tilted about any rotation axis running parallel to said plane P (or about two independent fixed rotation axes) with respect to the first housing section 3 (here the first housing section 3 is rigidly connected to the second housing section 4). Due to this tilting movement, the container 2 is deformed such that it essentially assumes a more or less pronounced wedge shape (prism) which has the effect that a light beam that travels along the axial direction A through the container 2 is deflected. The stronger the barrel 50 is tilted, the more pronounced said deflection becomes. This also allows to shift a projected image on the image sensor 52, for instance in order to achieve an optical image stabilization as explained herein.

The fact that the two housing sections 3, 4 can now be rigidly connected or can be integrally formed with one another further allows a better dust protection of the lens barrel 50.

Of course, moving the lens barrel along the axial direction can be performed independently from said tilting movement, so that the focal length of the lens 2 can be adjusted at the same time.

Figure 3:
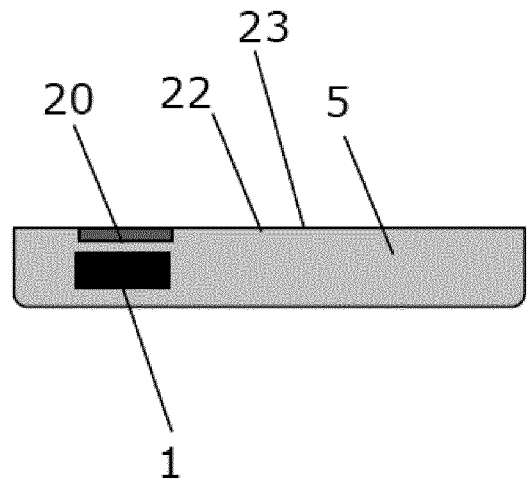
FIG. 3 shows a schematic a cross sectional view of a mobile phone having an optical device according to the invention.

Further, FIG. 3 shows an application of the optical device 1 according to the invention. Here, the optical device 1 forms a camera and is integrated into a mobile phone 5. Particularly, the cover element 20 can be an integral part of an (e.g. transparent) cover element 22 of the housing 23 of the mobile phone 5.

Figure 4:
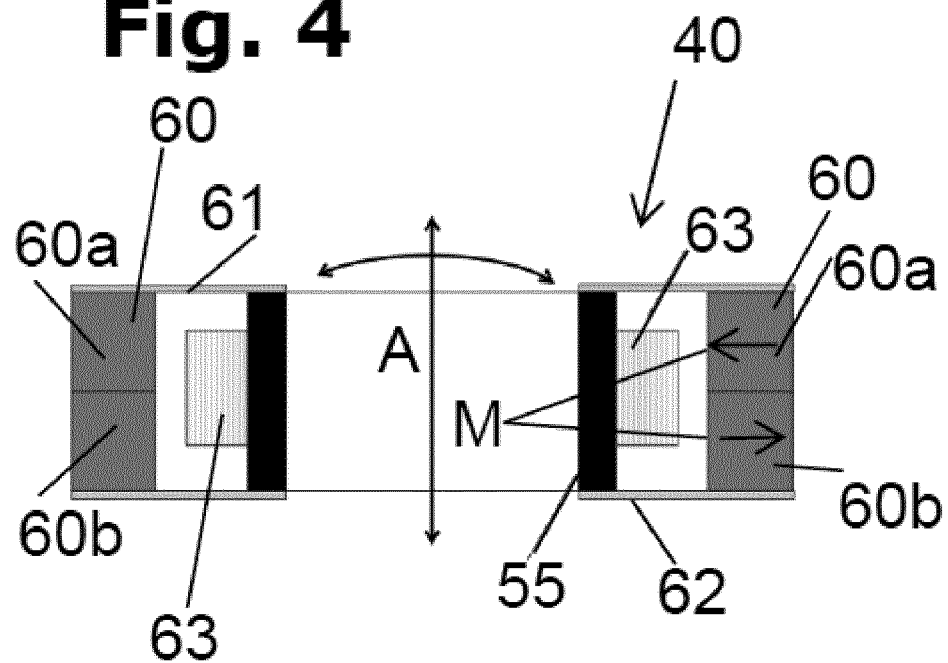
FIG. 4 shows an embodiment of an actuator means of the optical device according to the invention, by means of which actuator means the lens barrel can be moved axially or tilted about a rotation axis extending parallel to the plane along which the image sensor extends.

Further, FIG. 4 shows an embodiment of an actuator means 40 that can be used in order to move the lens barrel 50 in the axial direction A or to tilt it about an arbitrary rotation axis that runs parallel to said plane P along which said image sensor 52 extends.

Particularly, this actuator means 40 comprises a first and a second spring structure 61, 62, wherein the first spring structure 61 is arranged on top of four pairs of magnets 60, wherein each pair of magnets 60 comprises two magnets 60a, 60b arranged on top of one another in the axial direction A which comprise an antiparallel magnetization M, and wherein the second spring structure 62 connects to the lower side of the magnet pairs 60. Further the spring structures 61, 62 are connected to a circumferential holder 55 for holding the lens barrel 50. The spring structures 61, 62 elastically support the lens barrel holder 55 on the magnet pairs 60 such that it can move in the axial direction A and can also be tilted about said arbitrary rotation axes which is indicated with a curved arrow in FIG. 4. In order to exert corresponding forces on the lens barrel holder 55, the magnet pairs 60 are arranged around the holder 55 (in FIG. 4 only two opposing pairs 60 are shown), wherein each magnet pair 60 is associated to one of four coils 63 which are attached to the lens barrel holder 55 and face the respective magnet pair 60. In FIG. 4 the winding axis of the respective coil 63 is horizontal. By means of the magnet pairs 60 and coils 63 Lorentz forces can be generated that cause tilting and/or axial movement of the lens barrel holder 55.

The actuator means 40 works as follows. When a current is applied to the coils 63, the current interacts with the magnetic field and a Lorentz force is generated. The generated Lorentz force acts along the axial direction A and therefore moves the lens barrel holder 55 along the axis A or tilts the lens barrel holder 55.

Further, FIGS. 5A to 5D shows further embodiments of the container 2 that may be combined with the embodiments shown in FIGS. 1A to 1D and FIGS. 2A to 2D.

Figure 5A:
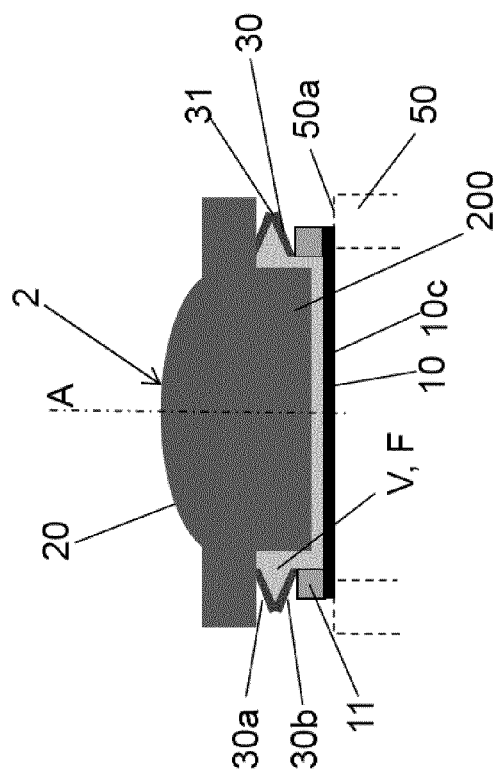
FIG. 5A to 5D show different embodiments of containers that can be used in the present invention.
Figure 5B:
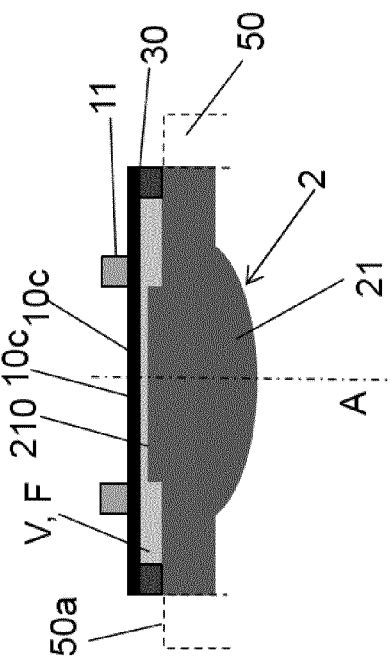

Particularly, the embodiments shown in FIG. 5A and FIG. 5B can be used as an alternative container 2 in the embodiments shown in FIG. 1C and FIG. 2C.

Figure 5C:
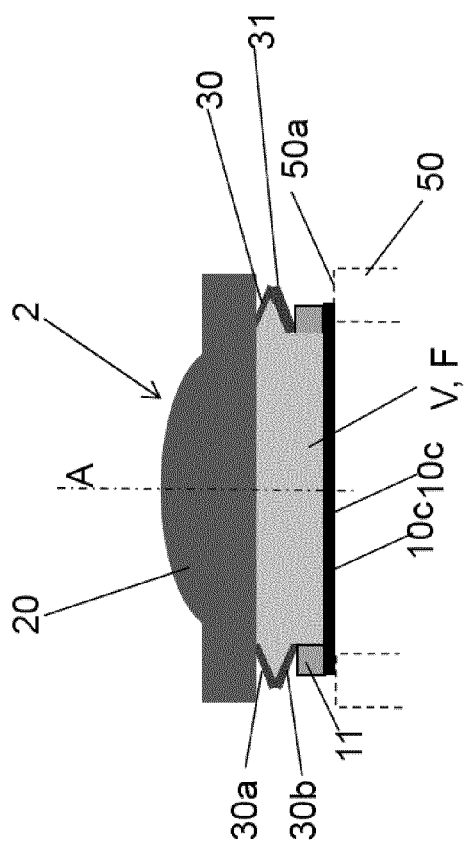
Figure 5D:
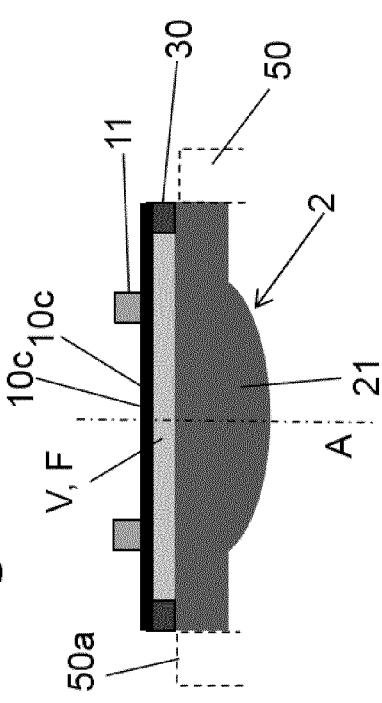

Further, particularly, the embodiments shown in FIGS. 5C and 5D can be used as an alternative container 2 in the embodiments shown in FIG. 1A and FIG. 2A.

In detail, as shown in FIG. 5A, the cover element 20 can be formed as a rigid lens, comprising e.g. a convex bulge on a side facing away from the membrane 20. Further, the lens shaping part 11 is connected to the membrane 10, which in turn, is connected to a face side 50a of the lens barrel 50 via a side facing away from the fluid F. Particularly, the inner diameter of the lens shaping part 11 can be smaller than the inner diameter of the lens barrel 50 at the face side 50a of the lens barrel 50 so that the curvature-adjustable area is clearly defined by the lens shaping part 11. Alternatively, the lens shaping part 11 can be larger than the inner diameter of the lens barrel 50 at the face side 50a of the lens barrel 50, in which case the lens barrel 50 defines the curvature-adjustable area.

Furthermore, particularly, the lens shaping part 11 is connected to the cover element 20 via a the wall member 30 which is formed as a bellows 30 such that its height in the axial direction A changes when the lens barrel 50 moves together with the membrane 10 and the lens shaping part 11 towards or away from the cover element 20 which is connected to the first housing section 3 (not shown in FIG. 5A). Particularly, the bellows 30 may comprise a circumferential crease 31 via which two sections 30a, 30b of the bellows 30 are connected to each other (e.g. integrally), so that the two sections 30a, 30b are folded onto one another when the lens shaping part 11 moves towards the cover element 20. Thereby, the fluid F between the sections 30a, 30b is pushed towards the center of the volume V.

FIG. 5B shows a modification of the container 2 shown in FIG. 5A, wherein here, in contrast to FIG. 5A, the cover element 20 comprises an (e.g. cylindrical) protrusion 200 that protrudes from the cover element 20 towards the membrane 10 and serves for adjusting the volume V of the container 2 as explained above.

Further, FIG. 5C shows a further embodiment of the container 2, wherein the lens shaping part 11 particularly protrudes from the cover element 20 (not shown in FIG. 5C) towards the membrane 20 and contacts the latter to define said area 10c. Here, the membrane is attached to wall member 30 which in turn is connected to the transparent rigid member 21. Particularly, the rigid member 21 can form the first lens in a lens stack held by the lens barrel 50. This allows one to actually integrate the container 2 into the lens barrel 50 which allows one to reduce the installation space in the axial direction A.

Finally, FIG. 5D shows a modification of the embodiment shown in FIG. 5C, wherein here, the cover element 20 comprises an (e.g. cylindrical) protrusion 200 that protrudes towards the membrane 10, which protrusion 200 serves for adjusting the volume V of the container 2 so that the thermal expansion of the fluid F can be compensated by means of the thermal expansion of the wall member 30.

The invention claimed is:

1. Optical device, comprising:
a first housing section,
a cover element connected to the first housing section,
a transparent and elastically expandable membrane which is arranged in said first housing section,
a container having a volume, wherein the membrane forms part of the container, and wherein said container is arranged in said first housing section,
a transparent fluid residing in said volume of the container,
a lens shaping part that is in contact with the membrane for defining a curvature-adjustable area of the membrane, which area faces said cover element,
a circumferential lens barrel that holds at least one rigid lens facing said container, wherein the lens barrel is arranged in said first housing section,
an image sensor facing the lens barrel and the container,
a second housing section, wherein the image sensor is arranged on the second housing section, and
an actuator means that is designed to move the lens barrel with respect to the first housing section in an axial direction so as to exert a force on said membrane via the lens shaping part for adjusting the pressure of the fluid residing inside the volume and therewith a curvature of said area, wherein said axial direction is oriented perpendicular to a plane along which said image sensor extends.

2. Optical device according to claim 1, characterized in that the actuator means is further designed to one of:
- moving the lens barrel together with the first housing section and said container parallel to said plane;
- tilting the lens barrel with respect to the first housing section about a rotation axis running parallel to said plane so as to exert a force on said membrane via the lens shaping part that deforms the container in order to deflect light traveling through the container.

3. Optical device according to claim 1, characterized in that the container comprises a circumferential wall member to which said membrane is connected.

4. Optical device according to claim 3, characterized in that the wall member is formed as a bellows comprising at least one circumferential crease.

5. Optical device according to claim 3, characterized in that the lens shaping part is connected to the cover element via the wall member.

6. Optical device according to claim 1, characterized that the membrane is connected to the lens barrel wherein the membrane is arranged between the lens barrel and the lens shaping part.

7. Optical device according to claim 1, characterized in that the lens shaping part is connected to the cover element, wherein particularly the lens shaping part protrudes from an inside of the cover element towards the membrane.

8. Optical device according to claim 3, characterized in that the container comprises a rigid transparent element connected to the wall member and facing said membrane, wherein said fluid is arranged between the rigid transparent element and the membrane.

9. Optical device according to claim 8, characterized in that said rigid transparent element is connected to the lens barrel.

10. Optical device according to claim 8, characterized in that said rigid transparent element forms a lens.

11. Optical device according to claim 9, characterized in that said rigid transparent element is arranged in a central opening surrounded by the lens barrel and particularly forms a first lens of a lens stack that is arranged in said opening and held by the lens barrel.

12. Optical device according to claim 8, characterized in that said rigid transparent element comprises a protrusion protruding towards said membrane.

13. Optical device according to claim 3, characterized in that the container comprises a further membrane that is connected to the wall member and faces said membrane, wherein said fluid is arranged between the two membranes.

14. Optical device according to claim 13, characterized in that the optical device comprises a further lens shaping part that is in contact with the further membrane for defining a curvature-adjustable area of the further membrane, which area faces the lens barrel.

15. Optical device according to claim 14, characterized in that the further lens shaping part is connected to the lens barrel and protrudes from the lens barrel towards the further membrane.

16. Optical device according to claim 13, characterized in that the optical device comprises a support member for supporting the wall member, which is particularly formed as a support ring, wherein the support member is connected to the lens barrel and protrudes from the lens barrel towards the wall member.

17. Optical device according to claim 1, characterized in that for moving the lens barrel along the axial direction and/or for tilting the lens barrel, the actuator means comprises at least three magnets, and at least three coils for receiving an electrical current, wherein said coils are attached to the lens barrel, and wherein the magnets are in proximity to said coils.

18. Optical device according to claim 1 characterized in that said cover element forms an integral part of a cover element of a housing of a mobile phone.

19. Optical device according to claim 1 characterized in that said cover element forms a lens.

20. Optical device according to claim 1 characterized in that said cover element comprises a protrusion protruding towards said membrane.

* * * * *